(12) United States Patent
Muller

(10) Patent No.: US 6,527,248 B1
(45) Date of Patent: Mar. 4, 2003

(54) SOLENOID VALVE WITH A MANUAL CONTROL PUSHBUTTON

(75) Inventor: Patrick Muller, Villez sous Bailleul (FR)

(73) Assignee: Parker Hannifin Rak SA, Annemasse Cedex (FR)

(*) Notice: Subject to any disclaimer, the term of this patent is extended or adjusted under 35 U.S.C. 154(b) by 0 days.

(21) Appl. No.: 09/711,902

(22) Filed: Nov. 15, 2000

(30) Foreign Application Priority Data

Nov. 25, 1999 (FR) .............................. 99 14835

(51) Int. Cl.$^7$ ..................... F16K 31/11; F16K 31/52; F16K 35/00
(52) U.S. Cl. .................... 251/111; 251/90; 251/129.03; 251/129.15; 251/251; 251/263
(58) Field of Search .................. 251/111, 113, 251/116, 129.03, 129.15, 251, 263, 90, 95, 96; 137/625.65

(56) References Cited

U.S. PATENT DOCUMENTS

| | | | | |
|---|---|---|---|---|
| 2,043,194 A | * | 6/1936 | Egglestron | 251/129.03 |
| 2,547,098 A | * | 4/1951 | Smith et al. | 251/129.03 |
| 2,608,353 A | * | 8/1952 | Cobb | 251/129.03 |
| 2,635,638 A | * | 4/1953 | Persons | 251/129.03 |
| 2,692,113 A | * | 10/1954 | Larkin, Jr. | 251/129.03 |
| 2,695,154 A | * | 11/1954 | Dillman | 251/129.03 |
| 2,829,861 A | * | 4/1958 | Wright | 251/129.03 |
| 3,236,494 A | * | 2/1966 | Frantz | 251/129.03 |
| 3,351,093 A | * | 11/1967 | Frantz | 251/129.03 |
| 3,938,555 A | * | 2/1976 | Swickley | 251/129.03 |
| 4,207,917 A | * | 6/1980 | Opel et al. | 137/269 |
| 4,344,603 A | * | 8/1982 | Hozumi et al. | 137/625.65 |
| 4,501,299 A | | 2/1985 | Klimowicz et al. | 251/129.03 |
| 4,534,381 A | * | 8/1985 | Hozumi et al. | 137/625.65 |
| 4,627,597 A | * | 12/1986 | Brausfeld et al. | 251/129.03 |
| 4,643,393 A | * | 2/1987 | Kosugi et al. | 251/129.03 |
| 5,285,814 A | | 2/1994 | Petterson et al. | 251/129.03 |
| 5,967,186 A | * | 10/1999 | Grueninger | 251/129.03 |

FOREIGN PATENT DOCUMENTS

| | | | |
|---|---|---|---|
| DE | 2158248 | 5/1973 | |
| DE | 3134756 | 3/1983 | |
| FR | 2388190 | 11/1978 | |
| JP | 0017269 | * 2/1983 | ............ 137/62 |

* cited by examiner

Primary Examiner—George L. Walton
(74) Attorney, Agent, or Firm—Birch, Stewart, Kolasch & Birch, LLP

(57) ABSTRACT

A solenoid valve comprising a body in which there is fixed an electromagnet having a plunger core carrying at least one valve member and movable between first and second positions corresponding respectively to an excited state and to a rest state of the electromagnet, and a manual control pushbutton mounted on the body transversely to the plunger core firstly to slide between an active position in which a cam-forming end of the pushbutton co-operates with the plunger core to bring it into its first position and an inactive position into which the pushbutton is returned resiliently and its cam-forming end is disengaged from the plunger core, and secondly, while in the active position, to pivot between a locked position in which the pushbutton co-operates with an abutment element secured to the body which opposes resilient return, and an unlocked position in which the pushbutton escapes from the abutment element, the abutment element including means enabling it to be releasably fixed to the body.

6 Claims, 2 Drawing Sheets

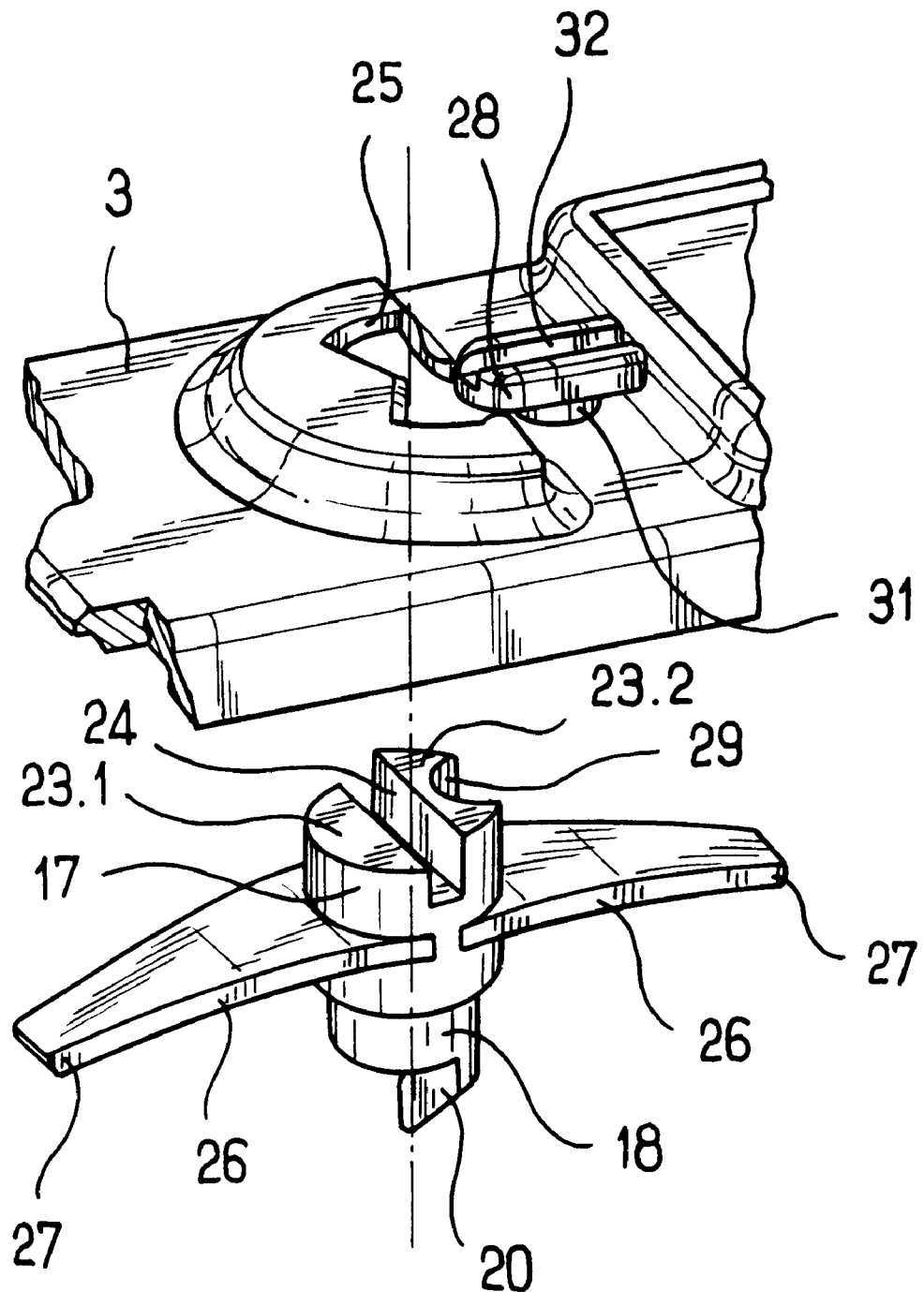
FIG_2

SOLENOID VALVE WITH A MANUAL CONTROL PUSHBUTTON

The present invention relates to a solenoid valve (an electrically-controlled pneumatic valve), e.g. for controlling directional control valves in pneumatic systems.

BACKGROUND OF THE INVENTION

In general, conventional types of solenoid valve comprise, in the most simple configuration, a body having a solenoid or electromagnet fixed therein with a plunger core carrying a valve member so as to move the valve member between a first position corresponding to an excited state of the electromagnet in which the valve member is spaced apart from its seat and puts two ducts into communication, and a second position corresponding to a non-excited state of the electromagnet in which the valve member is pressed against its seat and isolates the ducts from each other. Naturally, other types of solenoid valve also exist (e.g. having three ports and two positions) which, depending on the position of the valve member(s) serve to put one of two ducts selectively into communication with a third duct while isolating the other duct from the two in communication.

It is known to fit such a solenoid valve with a manual control pushbutton enabling the plunger core and the associated valve member to be brought into the first position in the absence of excitation of the electromagnet, e.g. for the purpose of performing adjustment operations.

A first type of pushbutton is mounted on the body transversely to the plunger core so as to slide between an active position in which a cam-forming end of the pushbutton co-operates with the plunger core and moves it into its first position, and an inactive position in which the pushbutton is returned resiliently and the cam-forming end is disengaged from the plunger core.

In a second type of pushbutton, of the bayonet kind, the pushbutton is mounted on the body firstly to slide between active and inactive positions like the pushbutton of the preceding type, and secondly, while it is in the active position, to pivot between a locked position in which the pushbutton co-operates with an abutment element secured to the body to prevent resilient return of the pushbutton into its inactive position, and an unlocked position in which the pushbutton escapes from the abutment element.

Pushbuttons of the first type are generally used in solenoid valves for associating with bistable directional control valves, whereas pushbuttons of the second type are generally used in solenoid valves for association with monostable directional control valves. Furthermore, the practices implemented by the users of solenoid valves have established preferences for one type or the other, and a manufacturer needs to comply with those preferences in order to satisfy the market as well as possible. The manufacturers of solenoid valves therefore need to have both types of pushbutton available, depending on the intended purpose of the solenoid valve, and even though the body structure of the valve is otherwise the same. This complicates the manufacture of such valves and gives rise to a relatively large amount of extra cost.

OBJECTS AND SUMMARY OF THE INVENTION

There thus exists a need that has not been resolved in satisfactory manner at present for a single manual control means for a solenoid valve which is simple to adapt as a function of the intended purpose of the valve on which it is mounted.

There also exists a need to change the manual access for adjustment and maintenance on a machine. While a machine is under development with qualified personnel, the possibility of locking manual controls in position is appreciated, whereas subsequently, in operation, it is preferred to eliminate any possibility of manual locking so as to ensure that unspecialized personnel cannot put the machine into a position where it can no longer operate properly.

To this end, the invention provides a solenoid valve comprising a body in which there is fixed an electromagnet having a plunger core carrying at least one valve member and movable between first and second positions corresponding respectively to an excited state and to a rest state of the electromagnet, and a manual control pushbutton mounted on the body transversely to the plunger core firstly to slide between an active position in which a cam-forming end of the pushbutton co-operates with the plunger core to bring it into its first position and an inactive position into which the pushbutton is returned resiliently and its cam-forming end is disengaged from the plunger core, and secondly while in the active position, to pivot between a locked position in which the pushbutton co-operates with an abutment element secured to the body which opposes resilient return, and an unlocked position in which the pushbutton escapes from the abutment element, the abutment element comprising means enabling it to be releasably fixed to the body.

When the abutment element is in place, the pushbutton can be locked in the active position like a bayonet pushbutton. The solenoid valve is then adapted to be used with monostable directional control valves or to satisfy users of a certain type. When the abutment element is withdrawn, the pushbutton cannot be locked in the active position and it operates like a simple pushbutton. The solenoid valve is then adapted to be used with bistable directional control valves or to satisfy other users. The solenoid valve is thus adapted to the type of directional control valve that it is to control in a manner that is particularly simple, either by leaving the abutment element for the manual control pushbutton in place or by withdrawing it. Furthermore, by means of this disposition, a solenoid valve is made available whose control can be lockable during an initial stage of use (machine being set up by specialized personnel) and which is no longer lockable for subsequent use (e.g. during normal operation of the machine) where the personnel is less specialized.

Advantageously, the abutment element is fixed to the body in a zone thereof which is accessible from the outside. The abutment element can then be withdrawn without any need to disassemble the valve, and it can be withdrawn quickly.

In a particular embodiment, the releasable fixing means comprise a breakable tab which is preferably arranged to break in twisting, the abutment element having an indentation suitable for co-operating with a screwdriver type tool. Withdrawal of the abutment element is then irreversible. Furthermore, the abutment element can be made integrally with the body, thus simplifying the structure of the valve and making it easier to manufacture.

BRIEF DESCRIPTION OF THE DRAWINGS

Other characteristics and advantages of the invention will appear on reading the following description of a particular non-limiting embodiment of the invention.

Reference is made to the accompanying drawings, in which:

FIG. 2 is a fragmentary exploded view of the valve.

MORE DETAILED DESCRIPTION

Figure 1:
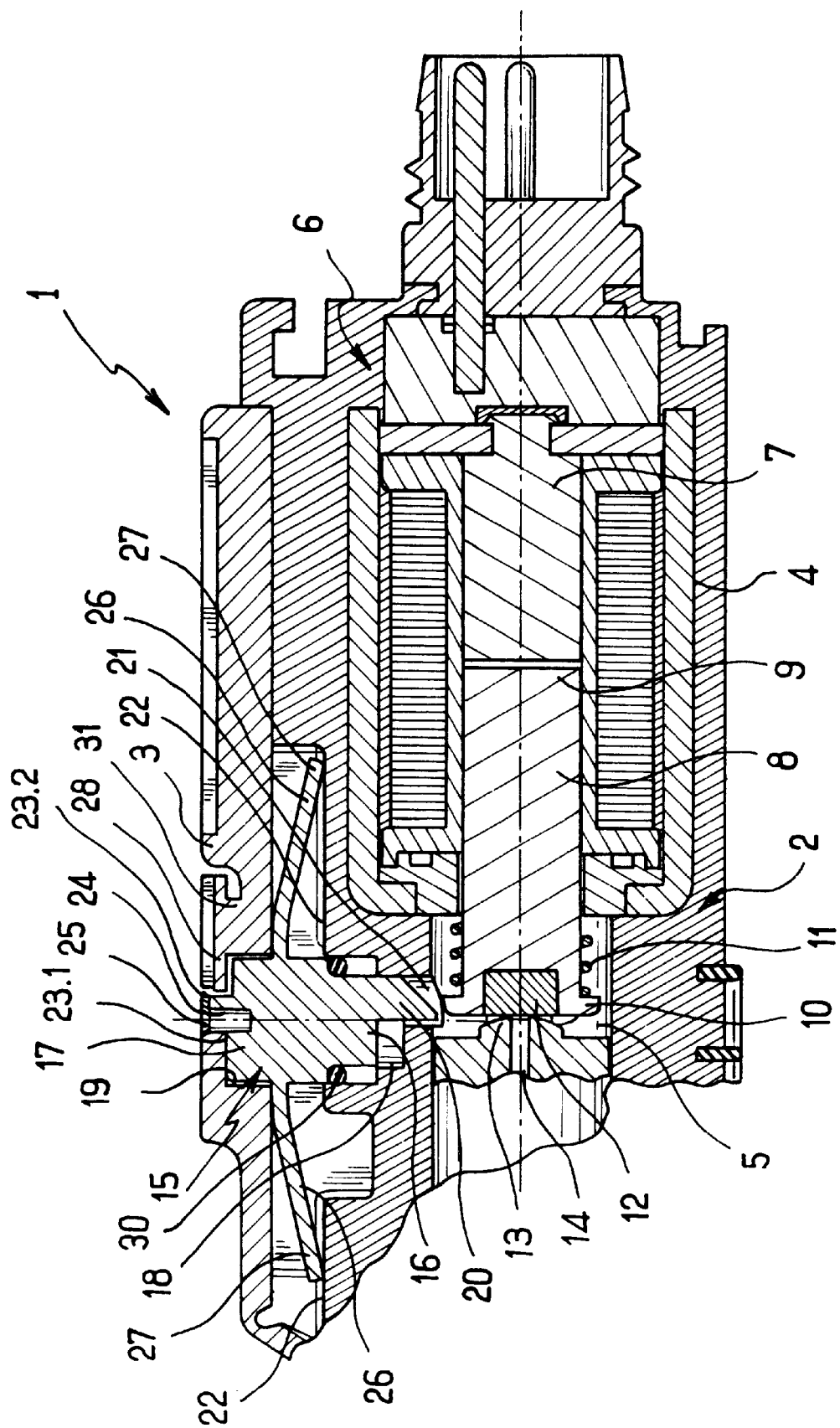
FIG. 1 is a fragmentary longitudinal section view of a solenoid valve in accordance with the invention.

The solenoid valve shown in the figures comprises a body given overall reference 1, made of a thermoplastic material and comprising a hollow-main portion 2 and a top cap 3 mounted on the main portion 2. The main portion 2 comprises two sections 4 and 5.

A first section 4 is overmolded on a solenoid or electromagnet given overall reference 6, comprising a frame, a coil, and a yoke 7.

In known manner, the electromagnet 6 possess a plunger core 8 which is slidably mounted in a cylindrical housing extending the yoke 7 and through an opening in the frame so as to have one end 9 adjacent to the yoke 7 and an opposite end 10 extending outside the frame. A spring 11 extends around the plunger core 8 between an end shoulder 10 and the frame, and it urges the plunger core 8 away from the yoke 7 in the absence of excitation. When the electromagnet 6 is excited, the magnetic forces involved overcome the effect of the spring 11 and press the end 9 of the plunger core 8 against the end wall of the yoke 7 (zero airgap).

The end 10 of the plunger core 8 penetrates inside a second section 5 of the main portion 2 which contains the pneumatic chamber of the solenoid valve. The end 10 has a central portion made of an elastomer material which constitutes a valve member 12 of the valve. The recess constituting said chamber receives a functional piece inserted as a force-fit and presenting an axial duct 14 that opens out firstly in an axial face of said piece forming a seat 13, and secondly to the outside of the section 5 via a duct (not shown) formed in said section.

In the absence of excitation, the valve member 12 is pressed against the seat 13 whereby the duct 14 opens out into the recess in the section 5. When the electromagnet is excited, the valve member 12 is separated from the seat 13 and puts the duct 14 into communication with at least one other duct (not shown here) provided in the main portion 2 and opening out into the recess of the section 5. Naturally, the number of valve members and the number of ducts opening out into the pneumatic chamber depends on the application intended for the valve. In particular, the valve can have two valve members associated in equipment connected to the plunger core.

The valve also has a manual control pushbutton given overall reference 15 that is generally cylindrical in shape, extending transversely relative to the plunger core 8 and having two opposite ends 16 and 17 which are received in two housings 18 and 19 formed in axial alignment in the main portion 2 and in the cover 3.

The end 16 has a terminal portion 20 in the form of a sector of a cone extending into a housing 21 whose cross-section in this case is a circular sector so as to allow the terminal portion 20 to move angularly in the housing 21. The housing 21 extends from the end wall of the housing 18 and opens out into the recess in the section 5. The housing 18 opens out remote from the housing 21 via an external face 22 of the main portion 2 extending beneath the cap 3.

The end 17 possesses a terminal face that is stepped to form two portions 23.1 and 23.2 which are separated by a groove forming an indentation 24 to enable it to be driven and which is accessible via an opening 25 formed in the end wall of the housing 19.

Two spring blades 26 extend transversely relative to the pushbutton 15 so that their free ends 27 bear against the outside face 22. In this case, the spring blades 26 are integrally formed with the pushbutton.

The pushbutton 15 is mounted in the housings 18 and 19 so as to slide between an active position and an inactive position which are described below.

In the inactive position (shown in FIG. 1), the spring blades 26 urge the pushbutton 15 so that the portion 23.1 of the terminal face of the end 17 is pressed against the end wall of the housing 19 and the portion 23.2 projecting relative to the portion 23.1 extends in the opening 25. The terminal portion 20 of the end 16 is then retracted into the housing 21 so as to be disengaged from the plunger core 8.

In the active position, the pushbutton 15 is pushed in (the spring blades 26 are then deformed) in such a manner that the terminal portion 20 of the end 16 projects into the section 5 and co-operates with the end 10 of the plunger core 8 so as to form a cam for displacing it, pressing the end 9 against the end wall of the yoke 7.

The valve has an abutment element 28 projecting into the opening 25 to be received in a groove 29 which is formed along the end 17 and which opens out in the portion 23.2 of the terminal face of said end of the pushbutton 15. The abutment element 28 is connected to the cap 3 by removable fixing means, in this case a tab 31 that can be broken by twisting, and it is provided with an indentation 32 suitable for co-operating with a screwdriver. This has the particular advantage of enabling the abutment element 28 and the cap 3 to be made as a single piece, thus simplifying manufacture of the valve. It would also be possible to fix the abutment element 28 by means enabling it to be removed and put back into place, e.g. by mounting the abutment element of a screw engaged in a tapped hole in the cap.

The abutment element 28 forms a pivot abutment for the pushbutton 15 while it slides between its inactive and active positions.

When the pushbutton 15 is fully pushed into its active position, the abutment element 28 extends from the groove 29 and extends slightly over the portion 23.2 of the terminal face of the end 17 facing the opening of the groove 29. The pushbutton 15 is then in an unlocked active position in which the spring blades 26 are capable of returning the pushbutton into its inactive position as soon as the depression force on the pushbutton 15 is released.

In the unlocked active position, the pushbutton 15 can be pivoted towards a locked active position in which the abutment element 28 no longer extends in register with the opening of the groove 29 but in register with the portion 23.2. The abutment element 28 then opposes the return force urging the pushbutton 15 into its inactive position as exerted by the spring blades 26.

It will be observed that sliding of the pushbutton between its inactive and active positions and pivoting of the pushbutton between its locked and unlocked positions can be performed in simple manner by driving the pushbutton 15 with a screwdriver co-operating with the indentation 24 in the end 17 through the opening 25 in the cap 3. It will also be observed that an O-ring 30 extends around the end 16 to seal sliding and pivoting thereof in the housing 18.

The solenoid valve as described herein is adapted to a first use (e.g. with monostable directional control valves).

To adapt the solenoid valve to bistable directional control valves, or more generally for a different use or with different personnel, it suffices to use a screwdriver to twist the tab 31 so that it breaks and to remove the abutment element 28. The pushbutton 15 can then no longer be locked in its active position.

Naturally, the invention is not limited to the embodiment described and variants can be applied thereto without going beyond the ambit of the invention as defined by the claims.

In particular, although the abutment element is described as being accessible from outside the body, the abutment element could be disposed on the outside face 22 or in a housing of the body that is hidden by a flap. The abutment element can also be fitted to the body instead of being made integrally with it or with a portion thereof.

What is claimed is:

1. A solenoid valve comprising a body in which there is fixed an electromagnet having a lockable plunger core carrying at least one valve member and slidable between first and second positions corresponding respectively to an excited state and to a rest state of the electromagnet, and a pushbutton mounted on the body to be manually operable, firstly, said pushbutton is slid along a direction that is transverse to the plunger core between an active position in which a cam-forming end of the pushbutton co-operates with the plunger core to bring it into its first position and an inactive position into which the pushbutton is returned resiliently and its cam-forming end is disengaged from the plunger core, and secondly, while in the active position, said pushbutton is at least partially rotated around said direction between a locked position in which the pushbutton lockingly co-operates with an abutment element secured to the body which opposes resilient return when said abutment element at least partially engages a portion of the pushbutton, and an unlocked position in which the pushbutton is unlockingly aligned with the abutment element along a portion thereof when the pushbutton is rotated from the locked position, wherein the abutment element includes means enabling it to be releasably fixed to the body.

2. A valve according to claim 1, wherein the abutment element is fixed to the body in a zone thereof which is accessible from the outside.

3. A valve according to claim 1, wherein the releasable fixing means comprise a breakable tab.

4. A valve according to claim 3, wherein the breakable tab is arranged to be breakable by twisting, and wherein the abutment element comprises an indentation for cooperating with a screwdriver type tool.

5. A valve according to claim 3, wherein the abutment element is made integrally with the body.

6. A valve according to claim 1, wherein the pushbutton has resilient return blades extending transversely to co-operate with the body and to return the pushbutton into its inactive position.

* * * * *